United States Patent
Jang et al.

(10) Patent No.: US 6,876,247 B2
(45) Date of Patent: Apr. 5, 2005

(54) HIGH VOLTAGE GENERATOR WITHOUT LATCH-UP PHENOMENON

(75) Inventors: Chae Kyu Jang, Kyungki-Do (KR); Sang Kwon Lee, Ichon-Shi (KR)

(73) Assignee: Hynix Semiconductor Inc., Kyungki-Do (KR)

( * ) Notice: Subject to any disclaimer, the term of this patent is extended or adjusted under 35 U.S.C. 154(b) by 0 days.

(21) Appl. No.: 10/738,233

(22) Filed: Dec. 17, 2003

(65) Prior Publication Data

US 2004/0239409 A1 Dec. 2, 2004

(30) Foreign Application Priority Data

May 28, 2003 (KR) .................................. 10-2003-0034131

(51) Int. Cl.$^7$ .................................................. G05F 3/02
(52) U.S. Cl. ...................................... 327/536; 327/537
(58) Field of Search ................................. 327/534, 535, 327/536, 537; 363/59, 60

(56) References Cited

U.S. PATENT DOCUMENTS

| | | | | |
|---|---|---|---|---|
| 5,929,693 A | * | 7/1999 | Kuroda ........................ 327/535 |
| 6,128,242 A | * | 10/2000 | Banba et al. ................ 365/226 |
| 6,147,914 A | | 11/2000 | Leung et al. |
| 6,275,096 B1 | * | 8/2001 | Hsu et al. .................... 327/535 |
| 6,282,108 B1 | * | 8/2001 | Yang ........................... 363/60 |
| 6,320,797 B1 | | 11/2001 | Liu |
| 6,333,873 B1 | | 12/2001 | Kumanoya et al. |
| 6,356,501 B2 | * | 3/2002 | Park et al. ................... 365/226 |
| 6,456,152 B1 | * | 9/2002 | Tanaka ........................ 327/536 |
| 6,483,728 B1 | | 11/2002 | Johnson et al. |
| 6,507,237 B2 | * | 1/2003 | Hsu et al. .................... 327/538 |
| 6,522,191 B1 | | 2/2003 | Cha et al. |
| 6,525,949 B1 | | 2/2003 | Johnson et al. |
| 6,765,428 B2 | * | 7/2004 | Kim et al. ................... 327/534 |
| 2002/0000837 A1 | | 1/2002 | Keeth et al. |
| 2002/0063594 A1 | | 5/2002 | Lee |
| 2002/0171470 A1 | | 11/2002 | Sim et al. |

* cited by examiner

Primary Examiner—Terry D. Cunningham
(74) Attorney, Agent, or Firm—Marshall, Gerstein & Borun LLP

(57) ABSTRACT

Provided is a high voltage generator including a level detector for selecting one of a plurality of voltage sources in accordance with an option control signal and comparing the selected voltage source with a Vpp voltage; a first oscillator for generating a plurality of pulse signals having different periods, the first oscillator being operated in accordance with the option control signal; a second oscillator for generating pulse signals, the second oscillator operated in accordance with the option control signal; a first charge pump for generating the Vpp voltage by performing a pumping operation in accordance with an output of the first oscillator, the first charge pump being enabled in accordance with the option control signal; and a second charge pump for generating the Vpp voltage by performing a pumping operation in accordance with an output of the second oscillator, the second charge pump being enabled in accordance with the option control signal.

6 Claims, 3 Drawing Sheets

HIGH VOLTAGE GENERATOR WITHOUT LATCH-UP PHENOMENON

BACKGROUND

1. Field of the Invention

The present invention relates to a high voltage generator for generating a higher voltage than a voltage of a power source by using a principle of pumping in a semiconductor memory apparatus and, more particularly, to a high voltage generator capable of selecting one of two types of pumps in case of two different external voltages, thereby obtaining a high pumping efficiency and improving a pumping stability without a latch-up phenomenon.

2. Discussion of Related Art

Generally, a high voltage (hereinafter, referred to as a Vpp) generator is an apparatus for applying a constant high voltage to a circuit within a chip requiring a higher voltage than an external voltage Vcc in a semiconductor device. Such the Vpp generator comprises a level detector for detecting a Vpp potential level and outputting the corresponding signal, a ring oscillator for generating pulses used for periodically pumping charges, a Vpp pumping circuit for pumping Vpp charges and a pump control circuit for controlling the Vpp pumping circuit in accordance with output pulses from the ring oscillator.

However, in case that external voltage or internal voltage comprises two types of voltages, for example, among 3.0V, 2.0V and 1.8V, two identical Vpp pumps need to be provided and then the external voltage and the internal voltage must be controlled with different mask options (metal options). Therefore, a protection circuit against a leak current and an unstable state the so-called latch-up state cannot be realized.

SUMMARY OF THE INVENTION

The present invention is directed to a high voltage generator capable of selecting one of two types of pumps in case of two different external voltages, thereby obtaining a high pumping efficiency and improving a pumping stability without a latch-up phenomenon.

In addition, the present invention is directed to a high voltage generator that can operate selectively two types of Vpp pumps by using the identical mask options or identical bonding options on the same wafer.

One aspect of the present invention is to provide a high voltage generator comprising: a level detector for selecting one of a plurality of voltage sources in accordance with an option control signal and comparing the selected voltage source with a Vpp voltage; a first oscillator for generating a plurality of pulse signals having different periods, the first oscillator being operated in accordance with the option control signal; a second oscillator for generating pulse signals, the second oscillator operated in accordance with the option control signal; a first charge pump for generating the Vpp voltage by performing a pumping operation in accordance with an output of the first oscillator, the first charge pump being enabled in accordance with the option control signal; and a second charge pump for generating the Vpp voltage by performing a pumping operation in accordance with an output of the second oscillator, the second charge pump being enabled in accordance with the option control signal.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

The present invention will be described in detail by way of a preferred embodiment with reference to accompanying drawings.

Figure 1:
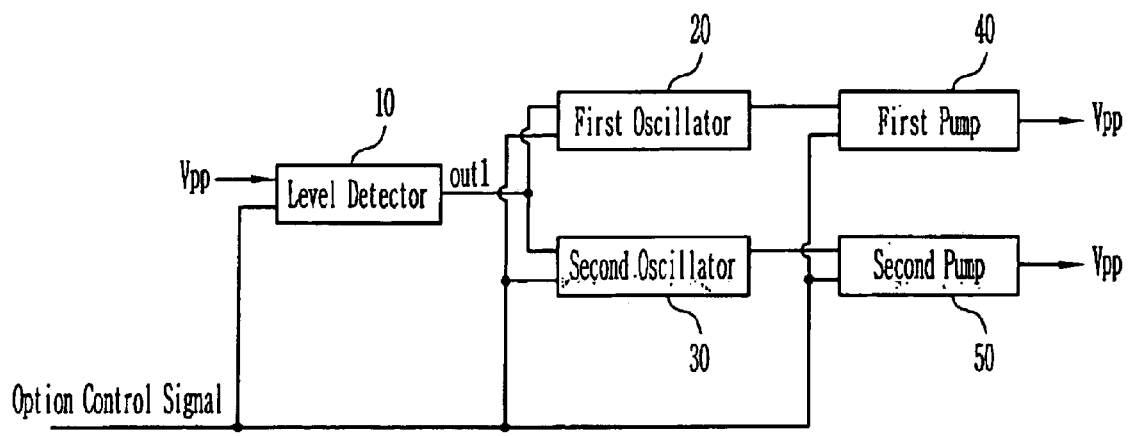
FIG. 1 is a block diagram of a high voltage generator according to the present invention.

FIG. 1 is a block diagram of a high voltage generator according to the present invention.

In accordance with option control signals, a level of a Vpp is detected from a level detector 10. That is, the level detector 10 generates, for example, a high or low-level signal by comparing the Vpp with a reference voltage Vcore. The output out1 of the level detector 10 is applied to a first oscillator 20 and a second oscillator 30. One of the first oscillator 20 or the second oscillator 30, which is selected in accordance with the option control signals, is driven in accordance with the output of the level detector 10.

That is, if the Vpp is higher than the reference voltage Vcore, the first oscillator 20 and the second oscillator 30 are not operated. The first oscillator 20 and the second oscillator 30 can be operated in different periods. The first oscillator 20 generates signals pre1, pre2, g1 and g2, which have different phases, and the second oscillator 30 generates a pulse osc.

The output of the first oscillator 20 is applied to a first pump 40 and the output of the second oscillator 30 is applied to a second pump 50. The construction of the first pump 40 is different from that of the second pump 50. The first pump 40 performs a pumping operation in accordance with the option control signal and the output of the first oscillator 20, while the second pump 50 performs a pumping operation in accordance with the option control signal and the output of the second oscillator 30. The first pump 40 or the second pump 50 generates the Vpp.

The option control signal, which has a high or low level, can be simply implemented by a metal bonding process during the manufacturing of a chip. Such a metal bonding process can be obtained using the same mask.

Stability of a pumping operation and pumping efficiency can be increased by proper selection and operation of two differently structured oscillators 20 and 30 and two differently-structured pumps 40 and 50, wherein the selection is performed in accordance with the level of the reference voltage.

Figure 2:
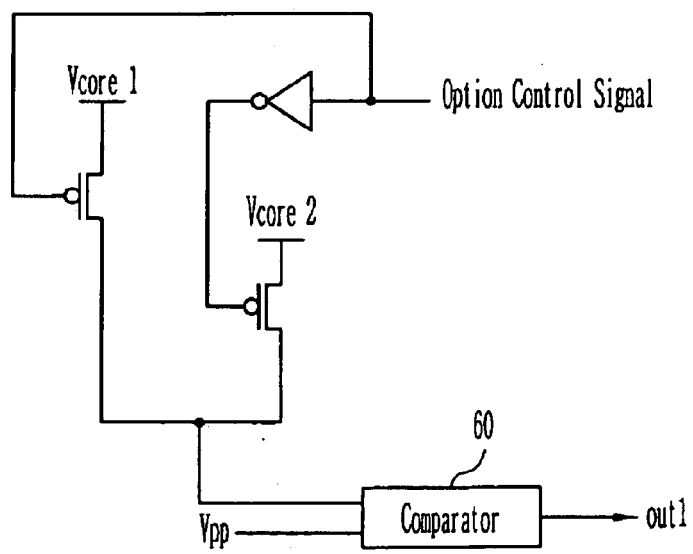
FIG. 2 is a detailed circuit diagram of a Vpp detector in FIG. 1.

FIG. 2 is a detailed circuit diagram of the level detector of FIG. 1.

A first reference voltage Vcore1 is supplied to a source of a PMOS transistor P1, and a second reference voltage Vcore2 is supplied to a source of a PMOS transistor P2. If the option control signal is at a high level, the PMOS transistor P1 is turned off. Since the option control that is inverted by the inverter 11 is at a lower level, the PMOS transistor P2 is turned on. Therefore, the second reference voltage Vcore2 is transferred to a comparator 60.

However, if the option control signal is at a low level, the PMOS, transistor P2 is turned off and the PMOS transistor P1 is turned on. The first reference voltage Vcore1 is transferred to the comparator 60. The comparator 60 compares the Vpp with the first reference voltage Vcore1 or the second reference voltage Vcore2 and outputs the corresponding low or high signal.

Figure 3:
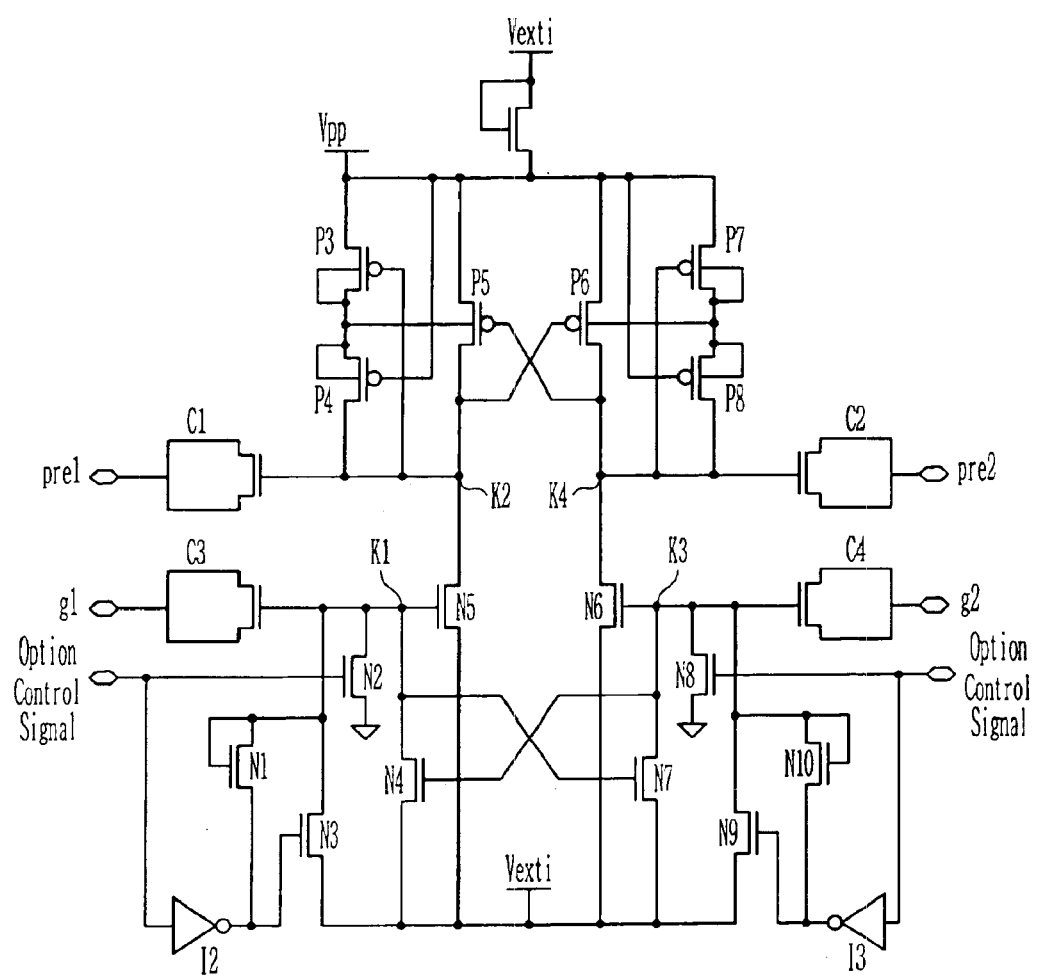
FIG. 3 is a detailed circuit diagram of a first pump in FIG. 1.

FIG. 3 is a detailed circuit diagram of the first pump of FIG. 1. The first pump will be described in detail with reference to FIG. 3. Preferably, the first charge pump comprises a double charge pump having a function of blocking latch-up and a leak current.

If the option control signal is at the high level, the NMOS transistors N2 and N8 are turned on, and thus, gates of the NMOS transistors N5 and N6 have ground potentials. Therefore, the first pump is disabled.

However, if the option control signal is at the low level, the NMOS transistors N2 and N8 are turned off. At this time, since the output of the inverter I2 is at the high level, the NMOS transistors N3 and N1 are turned on. Therefore, a node K1 is pre-charged. Further, since the output of the inverter I3 is at the high level, NMOS transistors N9 and N10 are turned on. Therefore, a node K3 is also pre-charged.

Figure 4:
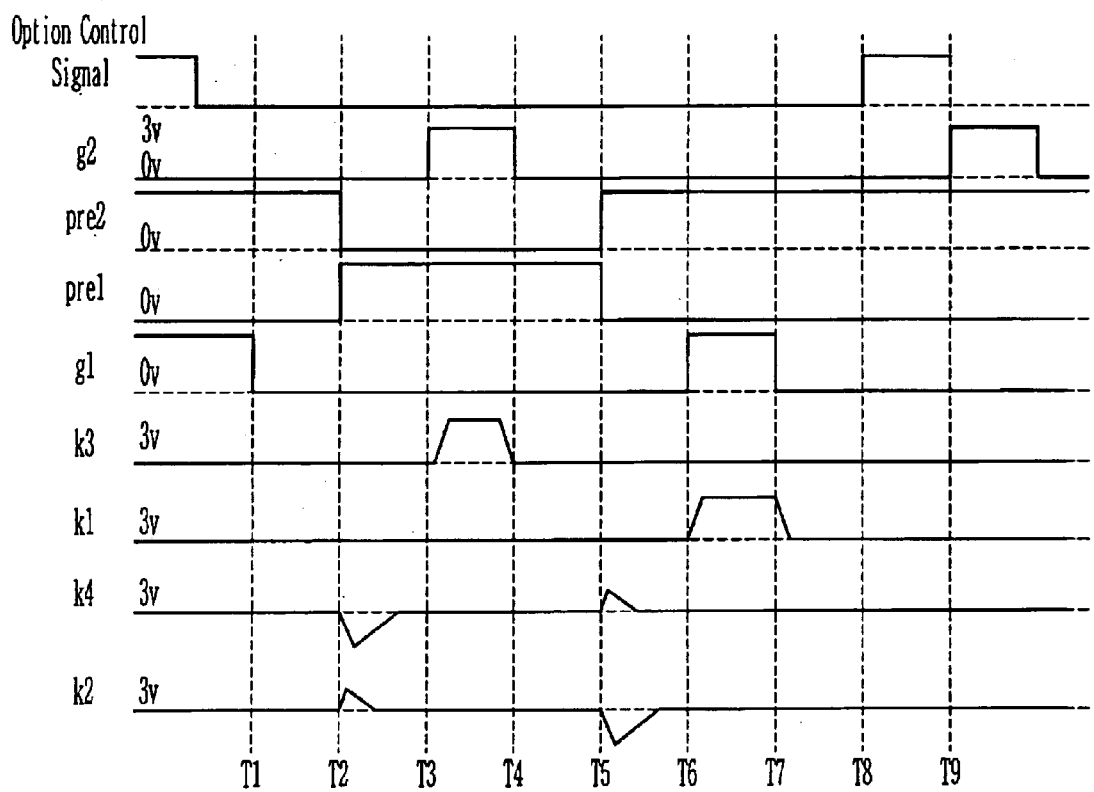
FIG. 4 is a waveform chart for explaining operations of FIG. 3.

At the time T2 of FIG. 4, signals pre1 and pre2 are in the inverted from each other. If the signal pre1 is transitioned from the low level to the high level, a node K2, to which a capacitor C1 is connected, is transitioned from the low level to the high level. Therefore, a PMOS transistor P6 is turned off.

If the signal pre2 is transitioned from the high level to the low level, a node K4, to which a capacitor C2 is connected, is at the low level. Therefore, the PMOS transistor P5 is turned on. As a result, the Vpp is raised by adding the potential of the node K2, to which the capacitor C1 is connected, to the external power source Vexti through a NMOS transistor N13.

At the time T3, the signal g1 is in the low state, while the signal g2 is transitioned from the low level to the high level. Therefore, the potential of the node K3 is raised by a bootstrap operation of a capacitor C3, so that the NMOS transistors N6 and N4 can be turned on. Therefore, a node K4 is pre-charged.

At the time T5, the signals pre1 and pre2 are in the inverted states from each other. If the signal pre2 is transitioned from the low level to the high level, a node K4, to which the capacitor C2 is connected, is transitioned from the low level to the high level. Therefore, the PMOS transistor P5 is turned off.

If the signal pre1 is transitioned from the high level to the low level, the node K2 in which the capacitor C1 is connected lowered the low level and thus the PMOS transistor P6 is turned on. Therefore, the Vpp is raised by adding the potential of the node K4, to which the capacitor C2 is connected, to the external power source Vexti through the NMOS transistor N13.

At the time T6, the signal g2 is in the low state, while the signal g1 is transitioned from the low level to the high level. Therefore, the potential of the node K1 is raised by a bootstrap operation of the capacitor C3. As a result, the NMOS transistors N5 and N7 are turned on. Therefore, the node K2 is pre-charged.

The PMOS transistors P3 and P4 are used for applying a bias voltage to a well of the PMOS transistor P5, and The PMOS transistors P7 and P8 are used for applying a bias voltage to a well of the PMOS transistor P6.

Figure 5:
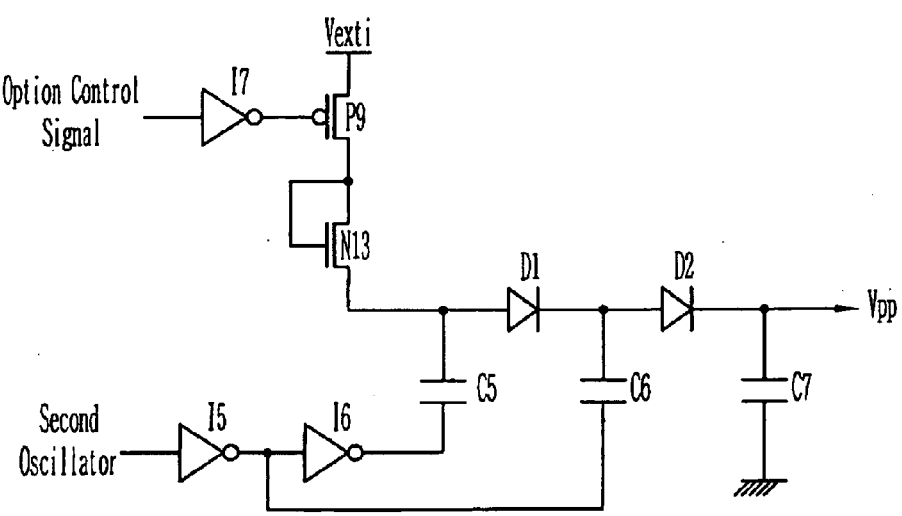
FIG. 5 is a detailed circuit diagram of a second pump in FIG. 1.

FIG. 5 is a detailed circuit diagram of the second charge pump of FIG. 1. Preferably, the second charge pump comprises a triple charge pump having a function of blocking a latch-up and a leak current.

If an option control signal is at the low level, the output of an inverter I7 is in the high state. Therefore, the PMOS transistor P9 is turned off, so that the second charge pump can be disabled.

If an option control signal is at the high level, the output of an inverter I7 is in the low state. Therefore, the PMOS transistor P9 is turned on, so that the external voltage Vexti can be applied to a diode. D1 for protecting a reverse-current through the PMOS transistor P9 and the NMOS transistor N13. Therefore, in accordance with the pulse signal being output from the second oscillator, capacitors C5 and C6 performs the pumping operations to generate the Vpp which is higher than external voltage. That is, the capacitor C6 performs the pumping operation in accordance with the output of an inverter I5, while the capacitor C5 performs the pumping operation in accordance with the output of an inverter I6. A diode D2 is used for protecting the reveres current and a capacitor C7 function as a load. The second oscillator generally comprises a ring oscillator.

According to the present invention, two types of the charge pumps can be selectively driven in accordance with one option signal. The option signal can simply be implemented by connection to a signal source on a wafer through a simple bonding process.

As mentioned above, according to the present invention, in case that external voltage or internal voltage comprises two types of voltages, for example, among 3.0V, 2.0V and 1.8V, two identical Vpp pumps are provided and then the external voltage and the internal voltage are controlled with different mask options (metal options) or through a simple bonding process, so that the pumping efficiency can be improved.

Although the foregoing description has been made with reference to the preferred embodiments, it is to be understood that changes and modifications of the present invention may be made by the ordinary skilled in the art without departing from the spirit and scope of the present invention and appended claims.

What is claimed is:

1. A high voltage generator, comprising:
    a level detector for selecting one of a plurality of voltage sources in accordance with an option control signal and comparing the selected voltage source with a Vpp voltage;
    a first oscillator for generating a plurality of pulse signals having different periods, the first oscillator being operated in accordance with the option control signal;
    a second oscillator for generating pulse signals, the second oscillator operated in accordance with the option control signal;
    a first charge pump for generating the Vpp voltage by performing a pumping operation in accordance with an output of the first oscillator, the first charge pump being enabled in accordance with the option control signal; and
    a second charge pump for generating the Vpp voltage by performing a pumping operation in accordance with an output of the second oscillator, the second charge pump being enabled in accordance with the option control signal.

2. The high voltage generator according to claim 1, wherein the level detector comprises:
    a first switching element for switching a supply of the first voltage source in accordance with the option control signal;
    a second switching element for switching a supply of the second voltage source in accordance with the option control signal; and
    a comparator for comparing the first or the second voltage with the Vpp voltage.

3. The high voltage generator according to claim 2, wherein each of the first and the second switching elements comprise a transistor.

4. The high voltage generator according to claim 1, wherein the second oscillator comprises a ring oscillator.

5. The high voltage generator according to claim 1, wherein the first pump comprises a double charge pump.

6. The high voltage generator according to claim 1, wherein the second pump comprises a triple charge pump.

* * * * *

UNITED STATES PATENT AND TRADEMARK OFFICE
CERTIFICATE OF CORRECTION

PATENT NO. : 6,876,247 B2  Page 1 of 1
DATED : April 5, 2005
INVENTOR(S) : Chae K. Jang et al.

It is certified that error appears in the above-identified patent and that said Letters Patent is hereby corrected as shown below:

<u>Title page,</u>
Item [75], Inventors, after "Sang Kwon Lee," please delete "Ichon-Shi" and insert
-- Kyungki-Do -- in its place.

Signed and Sealed this

Twenty-third Day of August, 2005

JON W. DUDAS
*Director of the United States Patent and Trademark Office*